United States Patent [19]

Stirbl et al.

[11] Patent Number: 5,447,147
[45] Date of Patent: Sep. 5, 1995

[54] SOLAR RADIATION CONCENTRATOR AND RELATED METHOD

[76] Inventors: Robert C. Stirbl, 247 Wadsworth Ave., New York, N.Y. 10033; Peter J. Wilk, 185 W. End Ave., New York, N.Y. 10023

[21] Appl. No.: 84,816

[22] Filed: Jun. 30, 1993

[51] Int. Cl.6 .............................. F24J 2/08; F24J 2/10
[52] U.S. Cl. ..................................... 126/714; 126/561; 126/684; 359/291; 359/846
[58] Field of Search ............... 359/846, 291, 292, 295, 359/290, 224; 126/687, 683, 684, 696, 561, 714

[56] References Cited

U.S. PATENT DOCUMENTS

| | | | |
|---|---|---|---|
| 1,714,443 | 5/1929 | Pineschi et al. | 359/291 X |
| 3,397,313 | 8/1968 | Mast | 359/292 X |
| 3,612,665 | 10/1971 | Vassiliou | 359/291 X |
| 4,392,711 | 7/1983 | Moraw et al. | 359/292 |

FOREIGN PATENT DOCUMENTS

1562626  5/1990  U.S.S.R. ............................... 126/684

OTHER PUBLICATIONS

Cosentino et al.; RCA-Array of Light Values Utilizing Liquid Surface Deformations Controlled by Vibrating Elements 7 May 1971; TN No. 884, pp. 1-3.

*Primary Examiner*—Carl D. Price
*Attorney, Agent, or Firm*—R. Neil Sudol; Henry D. Coleman

[57] ABSTRACT

A method for concentrating solar energy utilizes a pool of a homogenous fluidic substance disposed over a reflective surface. Mechanical energy is controllably imparted to the pool, for example, via synchronized electromechanical transducers, to generate a standing wave of the fluidic substance in the pool. Incoming solar radiation is differentially reflected from the pool and the reflective surface, upon generation of the standing wave in the fluidic substance, to concentrate the incoming solar radiation at a predetermined location spaced from the pool. At that predetermined location is a solar energy collector for absorbing and storing the solar radiation.

24 Claims, 2 Drawing Sheets

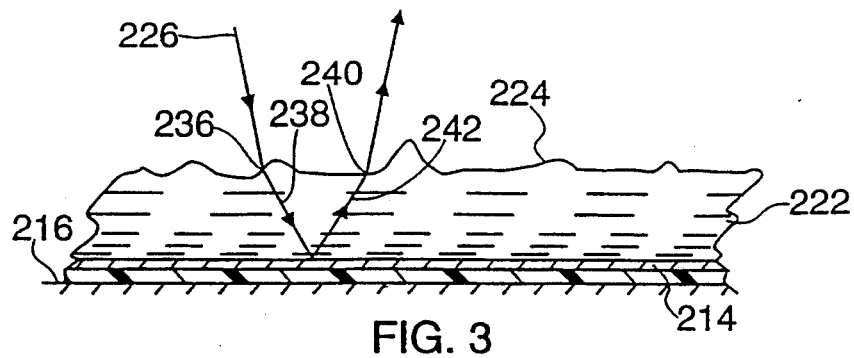
FIG. 3
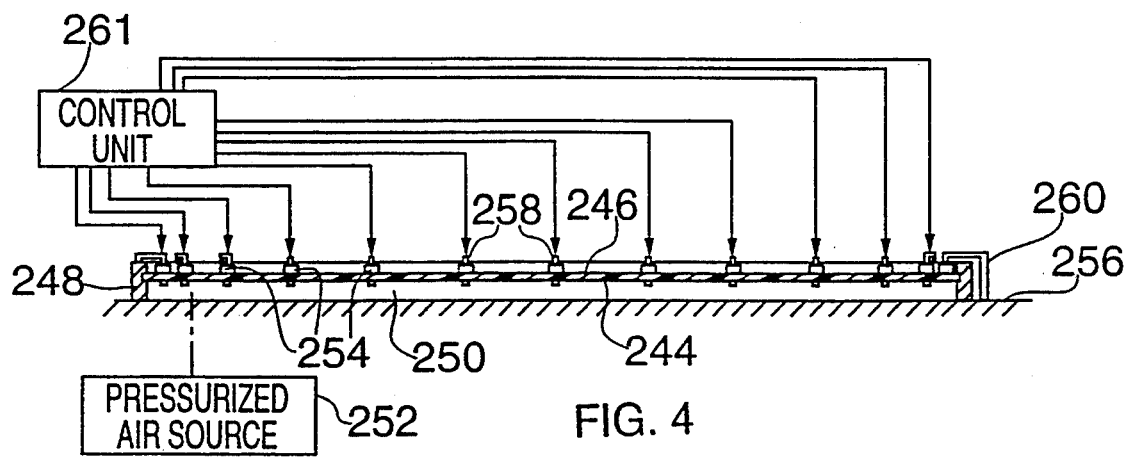
FIG. 4
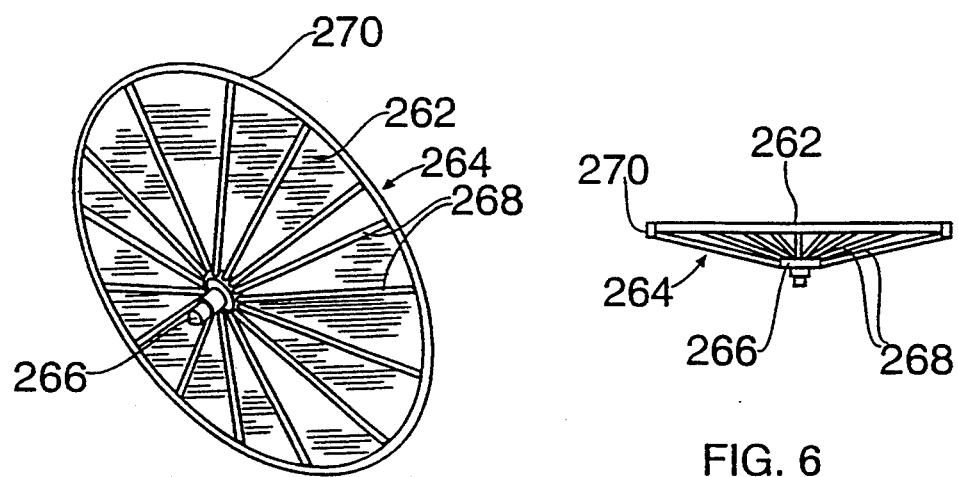
FIG. 5
FIG. 6

SOLAR RADIATION CONCENTRATOR AND RELATED METHOD

BACKGROUND OF THE INVENTION

This invention relates to a method and an associated apparatus for concentrating solar radiation. More particularly, this invention relates to a reflector of electromagnetic radiation and a method for forming the reflector.

It is well known that, with the exception of nuclear power, all of the energy on the earth originates with the sun. Extensive efforts in recent decades have been directed to harnessing solar radiation. Such efforts have resulted in huge mirrors erected on the earth's surface for concentrating incoming solar radiation on energy collectors. A problem with such mirrors is that they are expensive to construct.

OBJECTS OF THE INVENTION

An object of the present invention is to provide a method and/or an apparatus for concentrating solar radiation.

Another object of the present invention is to provide such a method and/or such an apparatus which is relatively inexpensive.

Another, more particular, object of the present invention is to provide such a method and/or apparatus which is readily adaptable to mirrors of differents sizes.

These and other objects of the present invention will be apparent from the drawings and detailed descriptions herein.

SUMMARY OF THE INVENTION

A method for concentrating solar energy comprises, in accordance with the present invention, the steps of forming a pool of a homogenous fluidic substance over an underlying surface, controllably imparting mechanical energy to the pool to generate a standing wave of the fluidic substance in the pool, and differentially reflecting incoming solar radiation from the pool, upon generation of the standing wave in the fluidic substance, to concentrate the incoming solar radiation at a predetermined location spaced from the pool.

The underlying surface of the pool may be a reflective surface, whereby incoming solar radiation may be refracted through the pool and reflected from the reflective surface to be concentrated on a solar energy collector. In the event that the concentration and collection of solar energy is to take place over an extended period, the collector may be either constrained to move in tandem with the sun or may have an elongated solar collecting element which is disposed or disposable along the path of the concentrated energy beam from a concentrator in accordance with the present invention.

According to another feature of the present invention, the pool is formed by disposing the reflective surface in an essentially horizontal orientation, erecting a generally upstanding circular wall about the surface to define a pool volume, and filling the pool volume with the homogenous fluidic substance.

According to a further feature of the present invention, the mechanical energy is imparted to the pool by providing a plurality of electromechanical transducers in operative contact with the wall, the transducers being spaced from one another along the wall, and periodically energizing the transducers to generate the standing wave in the pool of the fluidic substance.

According to an additional feature of the present invention, the differentially reflection of the solar radiation is accomplished by transmitting incoming solar radiation through the fluidic substance to the reflective surface at the bottom of the pool, refracting the solar radiation during passage thereof from the ambient air into the pool, reflecting the solar radiation from the reflective surface and out through the fluidic substance, and again refracting the reflected solar radiation during passage thereof from the pool into the ambient air.

According to a supplemental feature of the present invention, the method further comprises the step of substantially absorbing solar radiation concentrated at the predetermined location.

According to yet another feature of the present invention, the energizing of the transducers is implemented in part by controlling the intervals between successive activations of the transducers to generate a standing wave with a surface characterized by a Bessel function, a Hankel function, a modified Bessel function or a modified Hankel function.

A device for concentrating solar energy comprises, in accordance with the present invention, a homogenous fluidic substance, a container for holding the fluidic substance in a pool, the container having a substantially horizontal reflective surface, and a mechanical wave generator connected to the container for generating a standing wave in the fluidic substance of a predetermined characteristic shape able to concentrate incoming solar radiation at a predetermined location spaced from the pool.

Pursuant to another feature of the present invention, the container includes a substantially horizontal reflective surface and a circular wall surrounding the reflective surface, the wall and the reflective surface being contiguous with one another to define a pool.

Pursuant to a more specific embodiment of the present invention, the wave generator includes a plurality of electromechanical transducers in operative contact with the circular wall. The transducers are spaced from one another along the wall, while a control unit is operatively connected to the transducers for periodically energizing the transducers to generate the standing wave in the fluidic substance.

Pursuant to yet another feature of the present invention, the fluidic substance has a high index of refraction. The fluidic substance may be glycol, oil or a gel.

According to yet another feature of the present invention, the device further comprises a transparent sheet disposed above the pool for isolating the fluidic substance from wind and weather effects.

A solar concentrator in accordance with the present invention is inexpensive to manufacture and install.

A device for concentrating solar energy comprises, in accordance with another embodiment of the present invention, a reflective film, support elements in contact with the film for supporting the film in a substantially planar configuration, and a mechanical wave generator assembly connected to the film for generating a standing wave in the film of a predetermined characteristic shape able to concentrate incoming solar radiation at a predetermined location spaced from the film.

In accordance with a further feature of the present invention, the wave generator assembly includes a plurality of electromechanical transducers in operative contact with the film, the transducers being spaced from one another along the film. A control unit is operatively connected to the transducers for periodically energizing the transducers to generate the standing wave in the film.

A related method for concentrating solar energy comprises, in accordance with the present invention, the steps of providing a reflective film, supporting the film in a substantially planar configuration, and generating a standing wave in the film of a predetermined characteristic shape able to concentrate incoming solar radiation at a predetermined location spaced from the film.

BRIEF DESCRIPTION OF THE DRAWING

FIG. 3 is a schematic vertical cross-sectional view, on a substantially enlarged scale, of a of a portion of the solar energy concentrator of FIGS. 1 and 2, showing a wave perturbation in a surface of the concentrator, in accordance with the present invention.

FIG. 4 is partially a schematic vertical cross-sectional view and partially a block diagram of another device or system for concentrating solar energy, in accordance with the present invention.

FIG. 5 is a partial schematic perspective view of yet another device or system for concentrating solar energy, in accordance with the present invention.

FIG. 6 is a diagrammatic side elevational view of the solar energy concentrator of FIG. 5.

DETAILED DESCRIPTION

Figure 1:
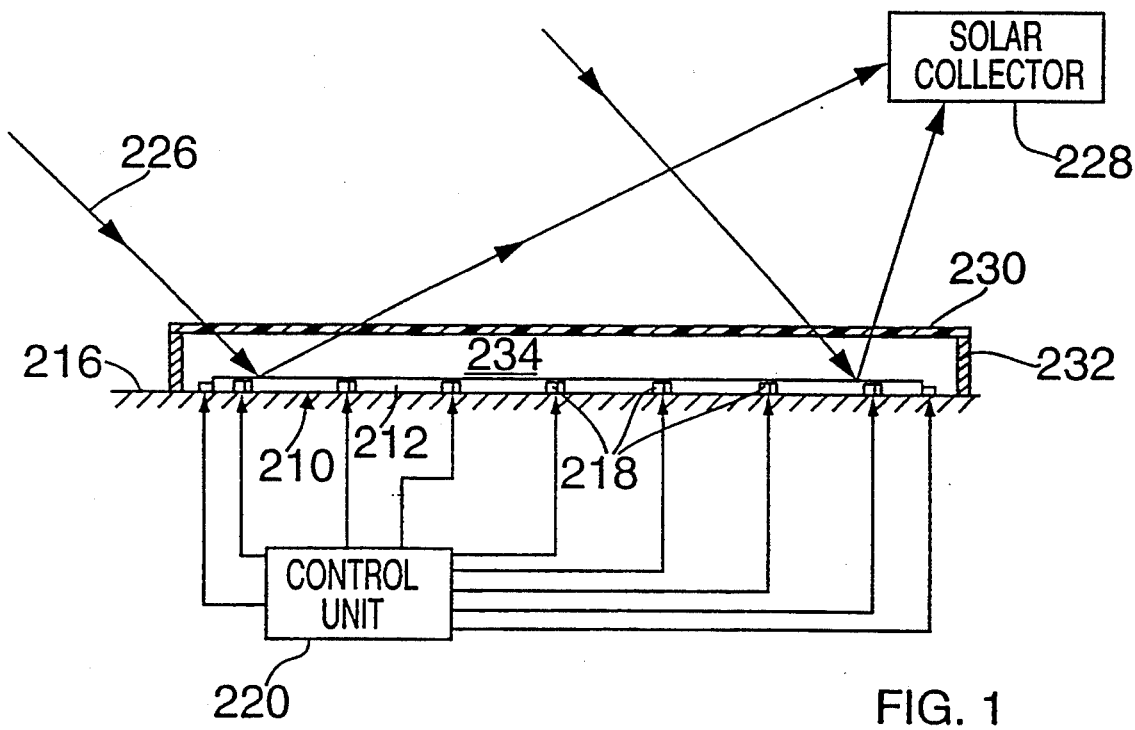
FIG. 1 is partially a schematic vertical cross-sectional view and partially a block diagram of a device or system for concentrating and collecting solar energy, in accordance with the present invention.
Figure 2:
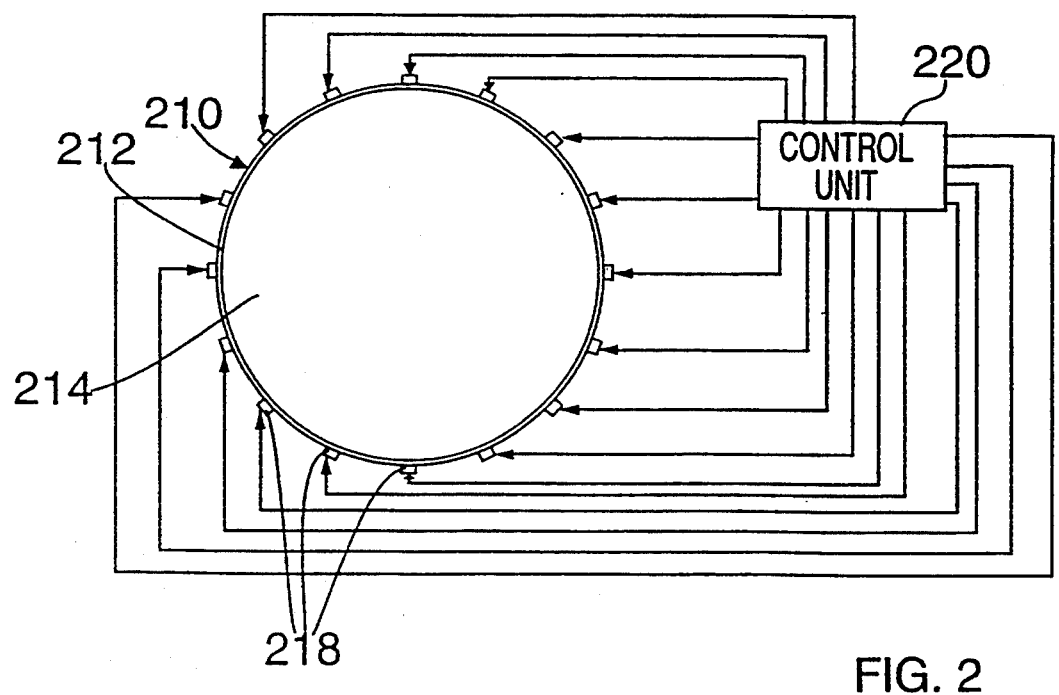
FIG. 2 is partially a schematic top view of a solar energy concentrator shown in FIG. 1 and partially a block diagram.

As illustrated in FIGS. 1 and 2, a device or apparatus for concentrating solar energy comprises a container 10 in the form of an upstanding circular side wall 12 and a reflective bottom wall or horizontal surface 14 contiguous therewith for defining a shallow pool. Bottom wall or horizontal surface 14 is disposed on a ground surface 16. However, the pool 10 could alternatively be placed on a tower (not shown) which in turn is support on the ground.

A plurality of equispaced mechanical wave generators 18 in the form of piezoelectric transducers are connected to pool side wall 12 along an outer surface thereof. A control unit 20 such as a microprocessor is connected to transducers 18 for periodically and synchronously energizing the transducers to generate a symmetric compressive force on side wall 12. To that end, transducers 18 are also connected to ground surface 16.

As depicted in FIG. 3, pool 10 holds a homogenous fluidic substance 22 such as glycol, oil or a gel having a relatively high index of refraction. Control unit 20 energizes transducers 18 to generate a standing wave 24 in the fluidic substance, and more particularly, in the upper surface of the fluidic substance. Standing wave 24 has a predetermined shape characterized by a Bessel function, a Hankel function, a modified Bessel function or a modified Hankel function. Accordingly, pool 10, and more specifically, standing wave 24 and reflective surface 14, are able to concentrate incoming solar radiation 26 (FIG. 1) onto a solar collector 28 at a predetermined location spaced from pool 10.

In the event that the concentration and collection of solar energy is to take place over an extended period, collector 28 may be either constrained to move in tandem with the sun or may have an elongated solar collecting element (not shown) which is disposed or disposable along the path of the concentrated energy beam from pool 10. For example, collector 28 may take the form of a curved metal tube carrying a circulating working fluid such as steam. A drive (not shown) may be connected to the metal collector tube for shifting the tube to track a concentrated solar beam from pool 10, the beam moving in response to or in tandem with the sun.

As further illustrated in FIG. 1, a transparent sheet 30 is disposed above pool 10 for isolating fluidic substance 22 from wind and weather effects. Together with an auxiliary side wall 32, sheet 20 defines a buffer chamber 34 over pool 10. Several such chambers (not shown) may be formed by several vertically spaced transparent sheets to enhance the buffering action.

As further depicted in FIG. 3, a differential reflection of incoming solar radiation 26 is accomplished by refracting at 36 the solar radiation upon passage thereof from ambient air into the fluidic substance 22 in pool 10, transmitting the refracted radiation 38 through fluidic substance 22 to reflective surface 14, reflecting refracted solar radiation 38 from reflective surface 14 and out through the fluidic substance, and again refracting at 40 the reflected solar radiation 42 upon passage thereof from pool 10 into the ambient air.

As shown in FIG. 4, another solar concentrator comprises a circular film 44 having a reflective surface 46. Film 44 is supported in a substantially planar configuration by an upstanding wall 48, to which the film is attached. Film 44 and wall 48 define a chamber 50 which is supplied with pressurized air from a source or pump 52. The pressurized air also serves to support film 44 so that the film maintains a substantially planar horizontal configuration.

A plurality of equispaced mechanical wave generators 54 in the form of piezoelectric transducers are mounted to wall 48 or directly to a ground surface 56 via respective brackets 58 or 60. Transducers 54 are connected to film 44 about the periphery thereof for imparting a transverse vibration to the film. A control unit 61 is operatively connected to transducers 54 for periodically and synchronously energizing the transducers to generate, in film 44, a transverse standing wave characterized by a Bessel function, a Hankel function, a modified Bessel function or a modified Hankel function. Accordingly, film 44 is able to concentrate incoming solar radiation onto a solar collector (not shown) at a predetermined location spaced from film 44. As with the embodiment of the invention illustrated in FIG. 1, a transparent sheet or series of transparent sheets may be positioned over film 44 to isolate or buffer the film from atmospheric perturbations.

A solar energy concentrator in accordance with the present invention may also be placed in space, in orbit around the earth. As illustrated in FIGS. 5 and 6, a reflective film 62 is supported in a substantially planar configuration by a frame 64 having, for instance, a hub 66, a plurality of essentially radial spokes 68 and a circular rim or wheel 70. The perpiphery of film 62 is vibrated by a plurality of angularly equispaced electromechanical transducers (not shown). The energy concentrated by the device of FIGS. 5 and 6 may be focused on a solar energy collector in space or on the surface of the earth.

Although the invention has been described in terms of particular embodiments and applications, one of ordinary skill in the art, in light of this teaching, can generate additional embodiments and modifications without departing from the spirit of or exceeding the scope of the claimed invention. For example, electromechanical transducers in the embodiments of FIGS. 4–6 may be connected to the films 44 and 62 via rings which extend around the films at the peripheries thereof.

It is to be noted, in addition, that the principles of the invention may be applied to solid, relatively rigid concentrators, as well as to pools of liquid or fluidic material and to films. In the case of a solid concentrator transparent sheet, synchronously energized transducers placed around the periphery of the sheet generate compressive standing waves in the material. Under the action of such compressive standing waves, which may be Bessel type or Hankel type functions, the index of refraction of the concentrator sheet is differentially modified according to the Bessel function or Hankel function. This index modification results in the concentration of incoming solar energy at a predetermined location, upon refraction through the sheet and reflection off of an underlying reflective layer.

It is to be noted further that a pool of fluidic material in accordance with the present invention may reflect incoming sunlight from an upper surface of the fluidic substance, that upper surface being characterized by a predetermined mathematical function. Thus, in some cases, reflection from an underlying reflective surface is not necessary to accomplish the objects of the invention. To enhance the reflective capability of the fluidic substance, a layer of an additional material of enhanced reflectivity may be permitted to float on the fluidic substance in the pool.

Accordingly, it is to be understood that the drawings and descriptions herein are profferred by way of example to facilitate comprehension of the invention and should not be construed to limit the scope thereof.

What is claimed is:

1. A method for concentrating solar energy, comprising the steps of:
   forming a pool of a homogenous fluidic substance;
   controllably imparting mechanical energy to said pool to generate a standing wave of said fluidic substance in said pool; and
   upon generation of said standing wave in said fluidic substance and by virtue of the generation of said standing wave, differentially redirecting incoming solar radiation impinging on said pool to concentrate the incoming solar radiation at a predetermined location spaced from said pool.

2. The method defined in claim 1 wherein said pool is defined in part by a reflective surface underlying said fluidic substance, said step of reflecting including the step of reflecting the incoming solar radiation from said reflective surface.

3. The method defined in claim 2 wherein said step of forming said pool includes the steps of:
   disposing said reflective surface in an essentially horizontal orientation;
   erecting a generally upstanding circular wall about said surface to define a pool volume; and
   filling said pool volume with said homogenous fluidic substance.

4. The method defined in claim 3 wherein said step of controllably imparting includes the steps of:
   providing a plurality of electromechanical transducers in operative contact with said wall, said transducers being spaced from one another along said wall; and
   periodically energizing said transducers to generate said standing wave of said fluidic substance in said pool.

5. The method defined in claim 4 wherein said step of differentially reflecting includes the steps of:
   refracting incoming solar radiation upon passage thereof from ambient air into said pool;
   transmitting the refracted solar radiation through said fluidic substance to said surface;
   reflecting the solar radiation from said surface and out through said fluidic substance; and
   again refracting the solar radiation upon passage thereof from said pool into the ambient air.

6. The method defined in claim 5, further comprising the step of substantially absorbing solar radiation concentrated at said location.

7. The method defined in claim 2 wherein said step of differentially reflecting includes the steps of:
   refracting incoming solar radiation upon passage thereof from ambient air into said pool;
   transmitting the refracted solar radiation through said fluidic substance to said surface;
   reflecting the solar radiation from said surface and out through said fluidic substance; and
   again refracting the solar radiation upon passage thereof from said pool into the ambient air.

8. The method defined in claim 1 wherein said step of controllably imparting includes the steps of:
   providing a plurality of electromechanical transducers in operative contact with said pool, said transducers being spaced from one another; and
   periodically energizing said transducers to generate said standing wave in said pool.

9. The method defined in claim 8 wherein said step of energizing includes the step of controlling the intervals between successive activations of said transducers to generate a standing wave with a surface characterized by a Bessel type function.

10. The method defined in claim 8 wherein said step of energizing includes the step of controlling the intervals between successive activations of said transducers to generate a standing wave with a surface characterized by a Hankel type function.

11. The method defined in claim 1, further comprising the step of substantially absorbing solar radiation concentrated at said location.

12. A method for collecting solar energy, comprising the steps of:
   providing a pool of a homogenous fluidic substance disposed over an underlying reflective surface and surrounded by a circular wall;
   also providing a plurality of electromechanical transducers in operative contact with said wall, said transducers being spaced from one another along said wall;
   further providing a solar energy collector;
   periodically energizing said transducers to generate a standing wave of said fluidic substance in said pool;
   refracting incoming solar radiation upon a passage thereof from ambient air into said pool;
   transmitting the refracted solar radiation through said fluidic substance to said surface;

reflecting the solar radiation from said surface and out through said fluidic substance;

again refracting the solar radiation upon passage thereof from said pool into the ambient air;

concentrating the incoming solar radiation, by virtue of said steps of refracting and reflecting, on said collector; and substantially absorbing solar radiation concentrated onto said collector by said steps of refracting and reflecting.

13. The method defined in claim 12 wherein said step of energizing includes the step of controlling the intervals between successive activations of said transducers to generate a standing wave with a surface characterized by a Bessel type function.

14. The method defined in claim 12 wherein said step of energizing includes the step of controlling the intervals between successive activations of said transducers to generate a standing wave with a surface characterized by a Hankel type function.

15. A device for concentrating solar energy, comprising:

a homogenous fluidic substance;

container means for holding said fluidic substance in a pool; and mechanical wave generating means connected to said container means for generating a standing wave in said fluidic substance of a predetermined characteristic shape able to concentrate incoming solar radiation at a predetermined location spaced from said pool.

16. The device defined in claim 15 wherein said container means includes:

a substantially horizontal reflective surface; add a circular wall surrounding said reflective surface, said wall and said reflective surface being contiguous with one another to define a shallow pool.

17. The device defined in claim 16 wherein said wave generating means includes:

a plurality of electromechanical transducers in operative contact with said wall, said transducers being spaced from one another along said wall; and control means operatively connected to said transducers for periodically energizing said transducers to generate said standing wave in said fluidic substance.

18. A device for concentrating solar energy, comprising:

a substantially horizontal surface;

a circular wall surrounding said surface, said wall and said surface being contiguous with one another to define a shallow pool;

a homogenous fluidic substance disposed in said pool;

a plurality of electromechanical transducers in operative contact with said wall, said transducers being spaced from one another along said wall; and control means operatively connected to said transducers for periodically energizing said transducers to generate a standing wave in said fluidic substance of a predetermined characteristic shape, whereby incoming solar radiation is concentrated by said pool and said fluidic substance at a predetermined location spaced from said pool.

19. The device defined in claim 18 wherein said fluidic substance has a high index of refraction.

20. The device defined in claim 19 wherein said fluidic substance is taken from the group consisting of glycol, oil and a gel.

21. The device defined in claim 18 wherein said transducers include piezoelectric crystals.

22. The device defined in claim 18, further comprising means disposed above said pool for isolating said fluidic substance from wind and weather effects.

23. The device defined in claim 18 wherein said standing wave is characterized by a function taken from the group consisting of a Bessel function, a modified Bessel function, a Hankel function, and a modified Hankel function.

24. The device defined in claim 18 wherein said surface is a reflective surface.

* * * * *